(12) United States Patent
Cummings

(10) Patent No.: US 8,362,395 B1
(45) Date of Patent: Jan. 29, 2013

(54) HAND HELD MIG WELDING SPARK SHIELD

(76) Inventor: Patrick Cummings, Hempstead, NY (US)

( * ) Notice: Subject to any disclaimer, the term of this patent is extended or adjusted under 35 U.S.C. 154(b) by 645 days.

(21) Appl. No.: 12/586,166

(22) Filed: Sep. 18, 2009

Related U.S. Application Data

(60) Provisional application No. 61/192,376, filed on Sep. 18, 2008.

(51) Int. Cl.
*H01H 3/00* (2006.01)

(52) U.S. Cl. .......................... 219/136; 219/72; 428/126

(58) Field of Classification Search .................. 219/147, 219/136, 137.2, 138, 72, 105, 121
See application file for complete search history.

(56) References Cited

U.S. PATENT DOCUMENTS

| | | | | |
|---|---|---|---|---|
| 4,039,798 A | * | 8/1977 | Lythall et al. | 219/72 |
| 4,172,974 A | * | 10/1979 | Stingelin et al. | 219/72 |
| 4,654,500 A | * | 3/1987 | Stiles et al. | 219/72 |
| 5,241,154 A | * | 8/1993 | Estrate | 219/147 |
| 6,328,709 B1 | * | 12/2001 | Hung et al. | 604/74 |
| 7,220,935 B2 | * | 5/2007 | Ireland et al. | 219/74 |

* cited by examiner

*Primary Examiner* — Steven Loke
*Assistant Examiner* — David Goodwin
(74) *Attorney, Agent, or Firm* — Robert J. Bird

(57) ABSTRACT

A welding shield includes a frusto-conical metal shield member, open at top and bottom, and including a wall opening for welding gun access. A lens is removably mounted in the top of the shield member, and a horizontal metal screen is removably mounted within the shield member between wall opening and lens. A circumferential base around the bottom is of a flexible and nonflammable material for effective closure around a weld work area. The work area is viewable, magnified, by the lens. The welding shield is lightweight for easy movement and placement by one available hand of the user.

2 Claims, 3 Drawing Sheets

HAND HELD MIG WELDING SPARK SHIELD

CROSS-REFERENCE TO RELATED APPLICATION

My related and copending Provisional Patent Application No. 61/192,376 was filed on Sep. 18, 2008. That filing date is claimed for this application.

BACKGROUND INFORMATION

This invention is a welding shield, and more specifically a hand held spark shield for use with the MIG welding process.

MIG (Metal Inert Gas) welding is performed with a spool of solid steel wire, fed to the weld site through the contact tip of a MIG gun. When the gun trigger is pulled, the electrically heated contact tip melts the wire to form the weld puddle. The welding process occurs in the weld puddle.

A typical welding shield is an integral part of a welder's helmet; it is the lens or window of the helmet.

The spark shield of this invention is separate and apart from a welder's helmet The shield is a cone-shaped device for placement by hand to cover the weld puddle work area. The shield is lightweight and easily movable as desired for best visibility of the welding operation.

SUMMARY OF THE INVENTION

In summary, this invention is a welding shield including a frusto-conical metal shield member, open at top and bottom, and including a wall opening for welding gun access. A lens is removably mounted in the top of the shield member, and a horizontal metal screen is removably mounted within the shield member between wall opening and lens. A circumferential base around the bottom is of a flexible and nonflammable material for effective closure around a weld work area. The work area is viewable, magnified, by the lens. The welding shield is lightweight for easy movement and placement by one available hand of the user.

DRAWING

DESCRIPTION

With reference to the drawings, my welding shield 10 includes a hollow frusto-conical metal shield member 12, open at top and bottom, with a flexible circumferential base portion 14 for conforming contact with a table, work surface, or the like. The flexible base portion 14 is of a nonflammable material.

Figure 1:
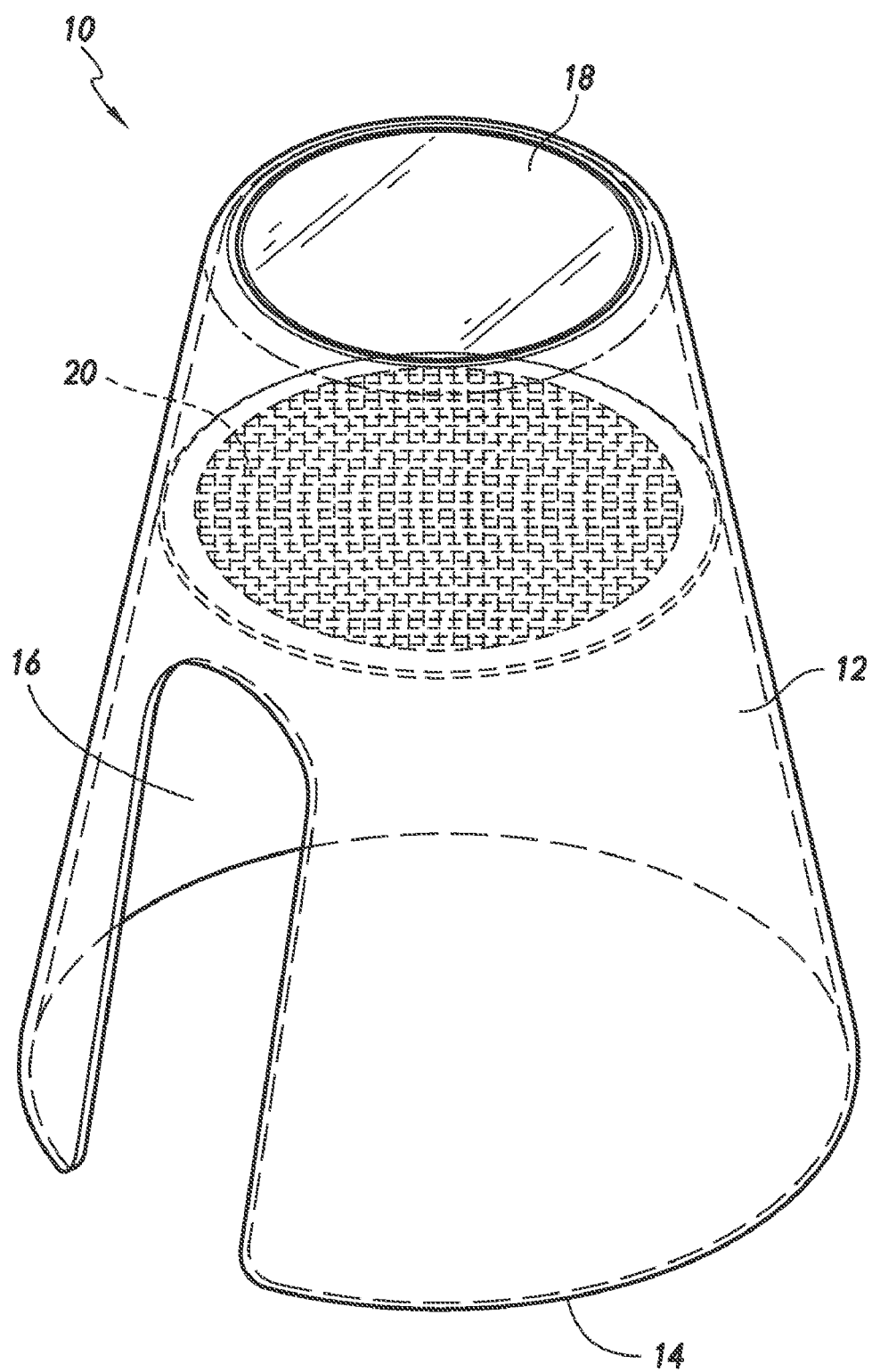
FIG. 1 is a perspective view of the welding shield of this invention.
Figure 2:
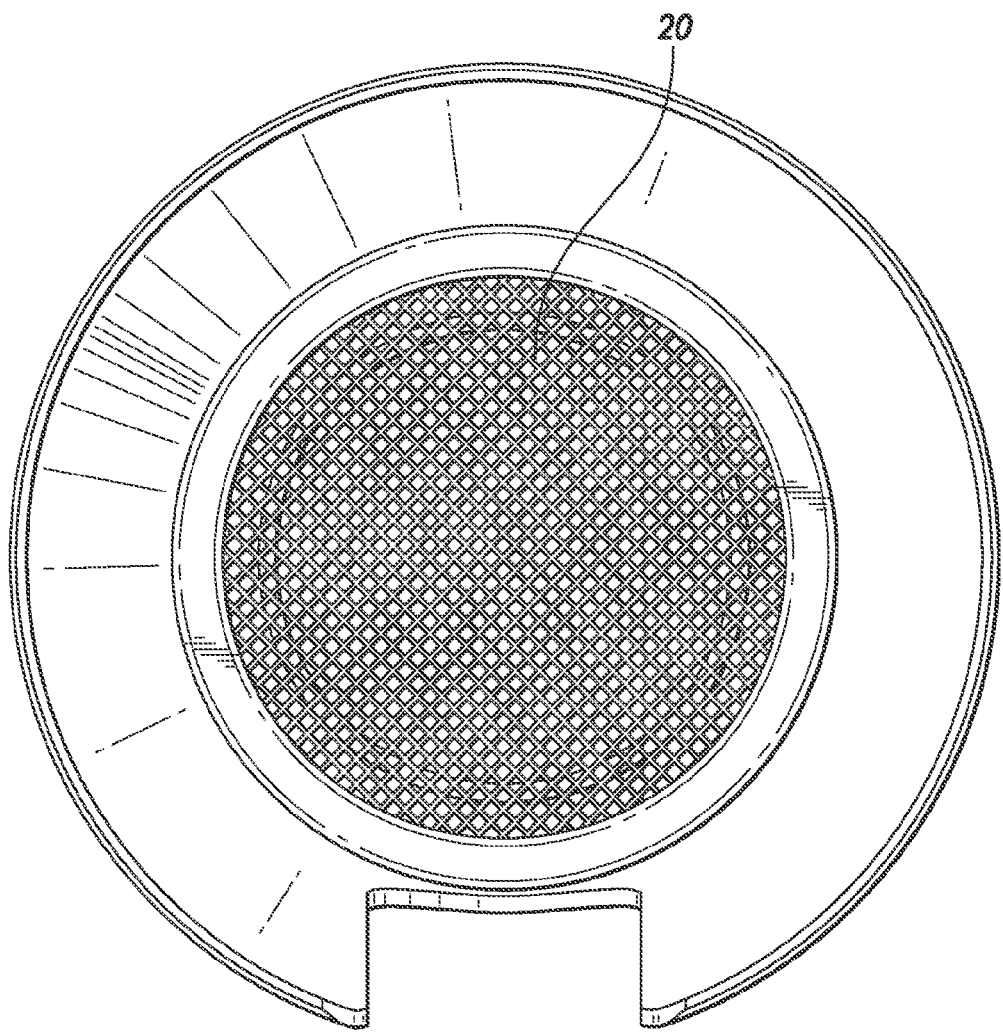
FIG. 2 is a bottom view of the welding shield of FIG. 1.

The frusto-conical shield member 12 includes a wall opening 16 for a hand-held MIG gun, a lens or window 18 in the top of the frusto-cone, and a metal screen 20 (FIG. 2) mounted horizontally within the cone between the opening 16 and lens 18.

Figure 3:
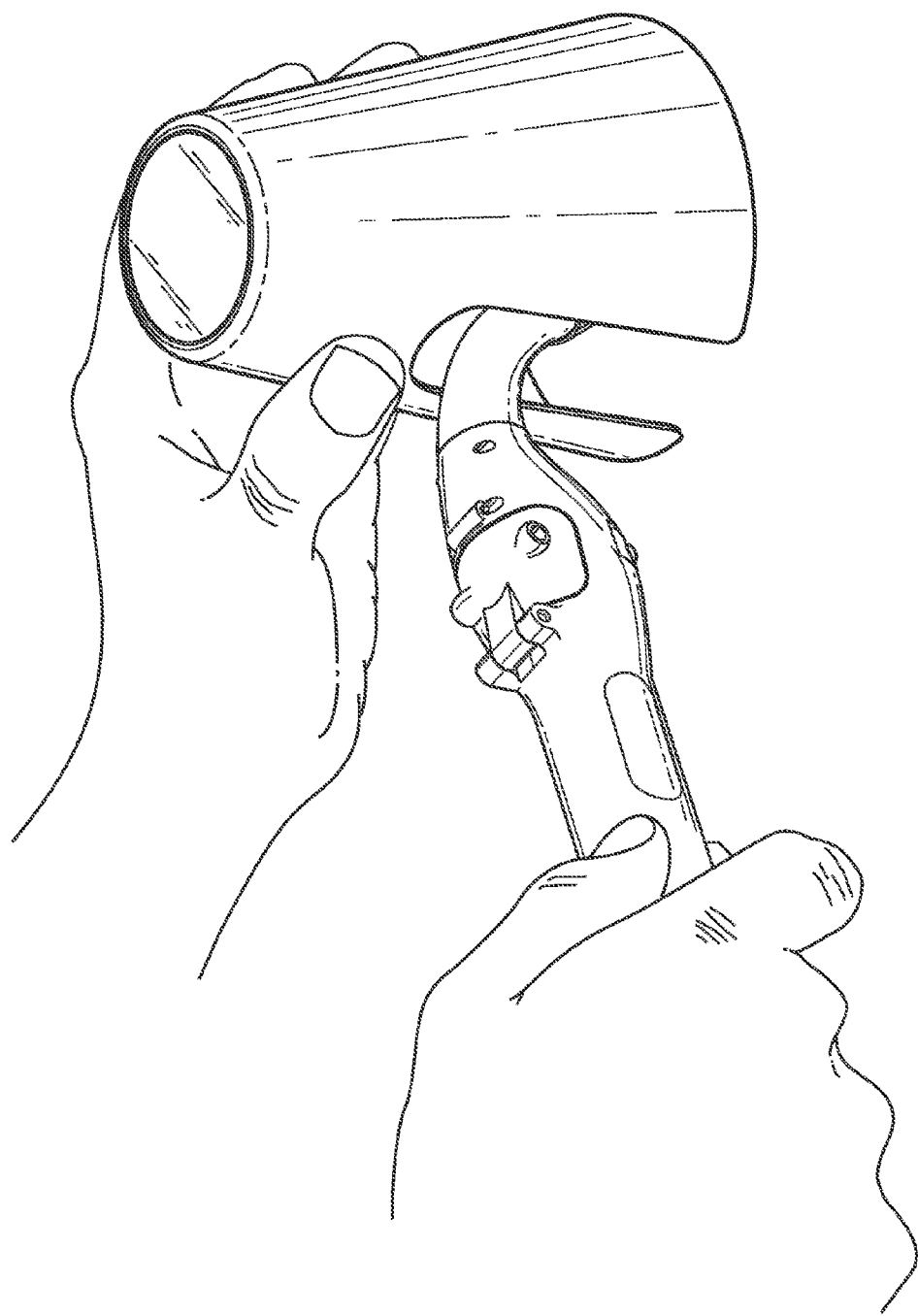
FIG. 3 is view similar to FIG. 1 showing the welding shield in use.

In use (FIG. 3) the welder-operator handles the shield member 10 with one hand, and manipulates a MIG gun 22 with the other hand. The work area is viewed through the lens 18. The welder-operator's view of the work area is magnified by the lens 18. The lens 18 and the viewer are protected from sparks by the internal screen 20.

The flexible base portion 14 is conformable to the table or other surface on which it sits to substantially prevent sparks from escaping under the shield. The flexible base 14 also provides spark protection when welding in tight, or angled, or irregular, work areas.

The screen 20 is subject to deterioration from impact by sparks. Accordingly, the screen is removable and replaceable as needed. Similarly, the lens is removable and replaceable in the less-likely event that it too is deteriorated by sparks.

The foregoing description of a preferred embodiment is illustrative of the invention. The concept and scope of the invention are, however, limited not by the details of that description but only by the following claims and equivalents thereof.

What is claimed is:

1. A hand-held welding shield for manual positioning, by its user, over a weld puddle work area, said shield including:
   a. a frusto-conical shield wall (12) having an open top and an open bottom for removable placement over and around said work area, said shield wall including a wall opening (16) for welding gun access to said work area;
   b. a window (18) mounted atop said shield wall (12) through which to view said work area;
   c. a horizontal screen (20) mounted within said shield wall (12) between said wall opening (16) and said window (18); and
   d. a circumferential base (14) around the bottom of said shield member, said base being of a flexible and non-flammable material to enhance the closure of said shield around said work area;
   e. said welding shield being adapted for movement and placement by a hand of said user.

2. A hand-held welding shield as defined in claim 1, in which said window is a lens to magnify a view of said work area.

* * * * *